(12) United States Patent
Hashimoto

(10) Patent No.: US 10,113,764 B2
(45) Date of Patent: Oct. 30, 2018

(54) AIR-CONDITIONING MANAGEMENT SYSTEM

(71) Applicant: Mitsubishi Electric Corporation, Tokyo (JP)

(72) Inventor: Yosuke Hashimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 219 days.

(21) Appl. No.: 15/108,817

(22) PCT Filed: Mar. 27, 2014

(86) PCT No.: PCT/JP2014/058838
§ 371 (c)(1),
(2) Date: Jun. 29, 2016

(87) PCT Pub. No.: WO2015/145655
PCT Pub. Date: Oct. 1, 2015

(65) Prior Publication Data
US 2016/0320084 A1    Nov. 3, 2016

(51) Int. Cl.
*F24F 5/00* (2006.01)
*F24F 11/00* (2018.01)
(Continued)

(52) U.S. Cl.
CPC .............. *F24F 11/30* (2018.01); *F24F 11/62* (2018.01); *F24F 11/41* (2018.01); *F24F 11/52* (2018.01);
(Continued)

(58) Field of Classification Search
CPC ...................................................... F24F 11/54
See application file for complete search history.

(56) References Cited

U.S. PATENT DOCUMENTS

2002/0152298 A1* 10/2002 Kikta ................... H04L 12/2803
                                                              709/223
2004/0107717 A1*  6/2004 Yoon ........................ F24F 11/30
                                                               62/230
(Continued)

FOREIGN PATENT DOCUMENTS

EP         2333442 A2    6/2011
JP       06-347083 A    12/1994
(Continued)

OTHER PUBLICATIONS

Extended EP Search Report dated Sep. 26, 2017 in corresponding EP patent application No. 14887481.1.
(Continued)

*Primary Examiner* — Mark A Connolly
(74) *Attorney, Agent, or Firm* — Posz Law Group, PLC

(57) ABSTRACT

An air-conditioning management system including air-conditioning apparatuses, a centralized monitoring apparatus, and an information processing terminal connectable to the centralized monitoring apparatus via a communication line, wherein the information processing terminal includes a schedule information reception unit that receives an input of schedule information of the air-conditioning apparatuses from a user, a schedule information management unit that stores, and a schedule information transmission unit that selects, from the plurality of items of the schedule information stored in the schedule information management unit, schedule information to be transmitted to the air-conditioning apparatuses and transmits the selected schedule information to the centralized monitoring apparatus, and wherein the centralized monitoring apparatus acquires the schedule information transmitted from the information processing terminal via the communication line and transmits the acquired schedule information to the air-conditioning apparatuses.

8 Claims, 4 Drawing Sheets

(51) Int. Cl.
*F24F 11/30* (2018.01)
*F24F 11/62* (2018.01)
*F24F 11/54* (2018.01)
*F24F 11/52* (2018.01)
*F24F 11/64* (2018.01)
*F24F 120/20* (2018.01)
*F24F 11/65* (2018.01)
*F24F 11/41* (2018.01)
*G05B 15/02* (2006.01)

(52) U.S. Cl.
CPC .............. *F24F 11/54* (2018.01); *F24F 11/64* (2018.01); *F24F 11/65* (2018.01); *F24F 2120/20* (2018.01); *G05B 15/02* (2013.01)

(56) References Cited

U.S. PATENT DOCUMENTS

| | | | | |
|---|---|---|---|---|
| 2010/0185758 | A1* | 7/2010 | Hoga | H04L 41/0893 709/223 |
| 2014/0049109 | A1* | 2/2014 | Kearns | H02J 3/00 307/52 |
| 2015/0012149 | A1* | 1/2015 | Behrangrad | G05F 1/66 700/295 |
| 2016/0154413 | A1* | 6/2016 | Trivedi | G05D 23/1917 700/276 |

FOREIGN PATENT DOCUMENTS

| | | |
|---|---|---|
| JP | 2000-121126 A | 4/2000 |
| JP | 2004-013574 A | 1/2004 |
| JP | 2007-183035 A | 7/2007 |
| JP | 2010-112678 A | 5/2010 |
| JP | 2010-165331 A | 7/2010 |
| JP | 2013-002680 A | 1/2013 |

OTHER PUBLICATIONS

International Search Report of the International Searching Authority dated Jun. 17, 2014 for the corresponding international application No. PCT/JP2014/058838 (and English translation).

Office action dated Apr. 3, 2018 issued in corresponding CN patent application No. 201480073014.4 (and English translation thereof).

* cited by examiner

AIR-CONDITIONING MANAGEMENT SYSTEM

CROSS REFERENCE TO RELATED APPLICATION

This application is a U.S. national stage application of International Application No. PCT/JP2014/058838 filed on Mar. 27, 2014, the disclosure of which is incorporated herein by reference.

TECHNICAL FIELD

The present invention relates to an air-conditioning management system, and particularly to schedule control.

BACKGROUND

Conventionally, in an air-conditioning management system including a plurality of air-conditioning apparatuses and a centralized monitoring apparatus (embedded device), the centralized monitoring apparatus (embedded device) manages schedule contents of the respective air-conditioning apparatuses. Further, the centralized monitoring apparatus performs schedule control of the air-conditioning apparatuses by transmitting commands to the respective air-conditioning apparatuses in accordance with the schedule contents held therein (see Patent Literature 1, for example).

Patent Literature

Patent Literature 1: Japanese Unexamined Patent Application Publication No. 6-347083 (page 2, page 3, FIG. 1, and FIG. 2)

The schedule contents vary depending on arrangement groups of the air-conditioning apparatuses and the days of the week. For example, if the number of groups is 50 and the respective days of the week, 30 singular days, and 2 types of schedule (control schedule and defrosting schedule, for example) are taken into account, the total number of patterns is 50 (the number of the groups)×(7 (the number of the days of the week)+30 (the number of the singular days))×2 (the number of the types))=3700. It is difficult for the centralized monitoring apparatus to manage all these patterns owing to the limitation of the storage capacity, and the reality is that the centralized monitoring apparatus manages a smaller number of patterns than the total number of patterns. Accordingly, a user has to make a selection from the limited patterns, and thus a schedule desired by the user may not necessarily be obtained.

SUMMARY

The present invention has been made in view of such an issue, and aims to provide an air-conditioning management system capable of realizing schedule control desired by the user.

An air-conditioning management system according to the present invention includes at least one air-conditioning apparatus, a centralized monitoring apparatus that performs centralized management of the air-conditioning apparatus, and an information processing terminal connectable to the centralized monitoring apparatus via a communication line. The information processing terminal includes a schedule information reception unit that receives an input of schedule information of the air-conditioning apparatus from a user, a schedule information management unit that stores a plurality of items of the schedule information received by the schedule information reception unit, and a schedule information transmission unit that selects, from the plurality of items of the schedule information stored in the schedule information management unit, schedule information to be transmitted to the air-conditioning apparatus and transmits the selected schedule information to the centralized monitoring apparatus. The centralized monitoring apparatus acquires the schedule information transmitted from the information processing terminal via the communication line and transmits the acquired schedule information to the air-conditioning apparatus.

According to the present invention, it is possible to obtain an air-conditioning management system capable of realizing schedule control desired by a user.

DETAILED DESCRIPTION

Embodiment 1

Figure 1:
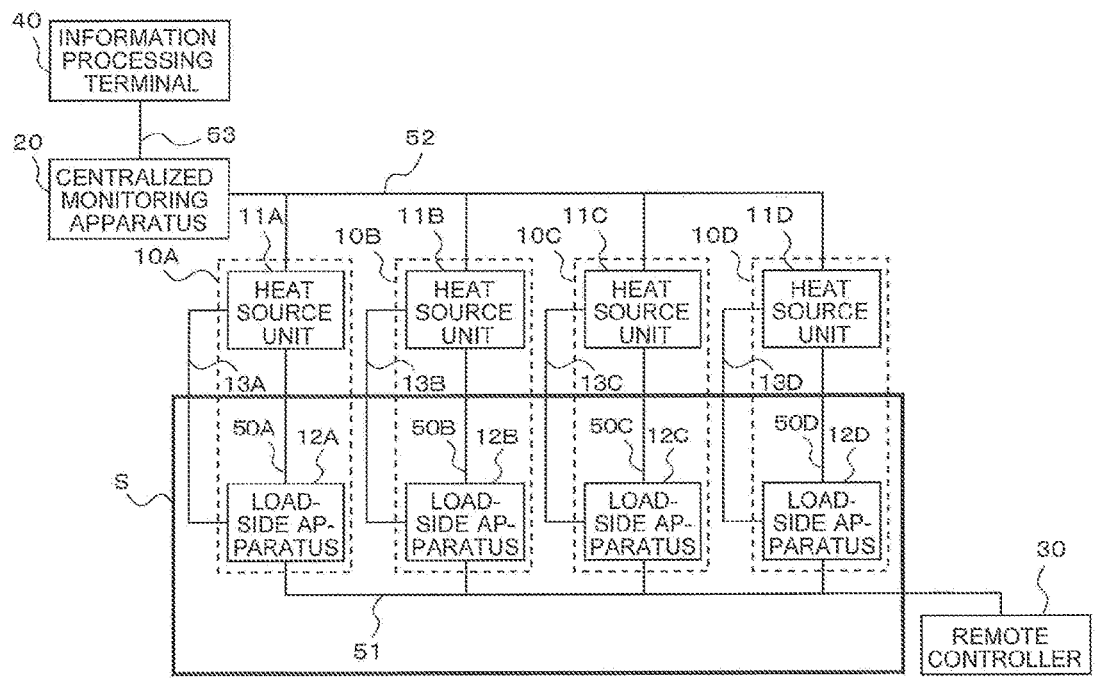
FIG. 1 is a diagram illustrating an example of a system configuration of an air-conditioning management system in Embodiment 1 of the present invention.

FIG. 1 is a diagram illustrating an example of a system configuration of an air-conditioning management system in Embodiment 1 of the present invention.

The air-conditioning management system includes a plurality of (four in this case) air-conditioning apparatuses 10A to 10D, a centralized monitoring apparatus 20, a remote controller 30, and an information processing terminal 40. These elements will sequentially be described below. The number of air-conditioning apparatuses is four here, but is not limited thereto, and may be any number equal to or greater than one.

The respective air-conditioning apparatuses 10A to 10D are configured to have heat source units 11A to 11D and load-side apparatuses 12A to 12D connected by refrigerant pipes 13A to 13D. Although described here is a configuration in which one load-side apparatus is connected to one heat source unit in each of the air-conditioning apparatuses 10A to 10D, the configuration may be such that a plurality of load-side apparatuses are connected to one heat source unit.

Further, the heat source units 11A to 11D and the load-side apparatuses 12A to 12D are communicably connected via communication lines 50A to 50D. The load-side apparatuses 12A to 12D are herein disposed in the same indoor space S and categorized in the same group, and each of the load-side apparatuses 12A to 12D is connected via a communication line 51 to the remote controller 30 that performs the operation of this group. The centralized monitoring apparatus 20 is communicably connected to the respective air-conditioning apparatuses 10A to 10D via a communication line 52. Further, the information processing terminal 40 is communicably connected to the centralized monitoring apparatus 20 via a communication line 53. The communication lines 50A to 50D, 51, 52, and 53 may be either wired or wireless.

Figure 2:
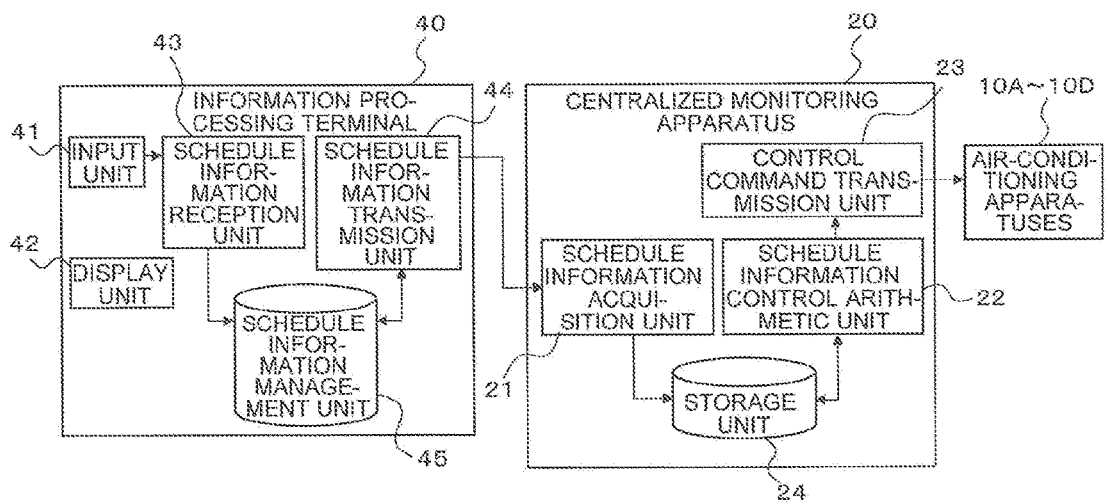
FIG. 2 is a functional block diagram illustrating a configuration example of an information processing terminal and a centralized monitoring apparatus in FIG. 1.

FIG. 2 is a functional block diagram illustrating a configuration example of the information processing terminal and the centralized monitoring apparatus in FIG. 1. The information processing terminal 40 includes an input unit 41 such as a keyboard and a mouse, a display unit 42 such as a liquid crystal panel, a schedule information reception unit 43, a schedule information transmission unit 44, and a schedule information management unit 45. The information processing terminal 40 is formed of a computer, and includes, for example, a microcomputer including a CPU, a RAM, a ROM, and other devices. The ROM stores a control program. Further, the schedule information reception unit 43 is functionally configured by the CPU and the control program. Further, the schedule information transmission unit 44 is formed of a communication circuit, for example.

The schedule information reception unit 43 receives schedule information input from a user with the input unit 41. The information processing terminal 40 displays on the display unit 42 an input screen for inputting the schedule information, allowing the user to freely input the schedule information by, for example, operating the input unit 41 while viewing the input screen.

The schedule information management unit 45 stores a plurality of items of the schedule information received by the schedule information reception unit 43. The schedule information management unit 45 is normally formed of a storage device such as a hard disk with a capacity greater than that of a later-described memory 24 of the centralized monitoring apparatus 20 formed of an embedded device, and is capable of storing a multitude of patterns of schedule information.

At a preset scheduled time, the schedule information transmission unit 44 selects schedule information for the next day and the day after next for each of the plurality of air-conditioning apparatuses 10A to 10D from the plurality of items of the schedule information stored in the schedule information management unit 45, and transmits the selected schedule information to the centralized monitoring apparatus 20, as a daily scheduled process.

The centralized monitoring apparatus 20 will now be described. The centralized monitoring apparatus 20 includes a schedule information acquisition unit 21, a schedule control arithmetic unit 22, a control command transmission unit 23, and the memory 24 formed of a storage device. The centralized monitoring apparatus 20 is formed of a computer, and includes, for example, a microcomputer including a CPU, a RAM, a ROM, and other devices. The ROM stores a control program. Further, the schedule information acquisition unit 21 and the schedule control arithmetic unit 22 are functionally configured by the CPU and the control program. Further, the control command transmission unit 23 is formed of a communication circuit, for example.

The schedule information acquisition unit 21 acquires from the information processing terminal 40 the schedule information for the next day and the day after next for each of the air-conditioning apparatuses 10A to 10D, and stores the schedule information in the memory 24. For example, the start time and the stop time of a heating or cooling operation, the execution timing of a defrosting operation, and other items are set in the schedule information. The schedule control arithmetic unit 22 calculates (selects) the corresponding schedule information for each of the air-conditioning apparatuses 10A to 10D from the plurality of items of the schedule information stored in the memory 24. At a preset scheduled time, the control command transmission unit 23 transmits, as a control command, the schedule information calculated (selected) by the schedule control arithmetic unit 22 to each of the air-conditioning apparatuses 10A to 10D as a daily scheduled process.

Operations of schedule control in the air-conditioning management system of Embodiment 1 will now be described with reference to FIG. 3 and FIG. 4.

Figure 3:
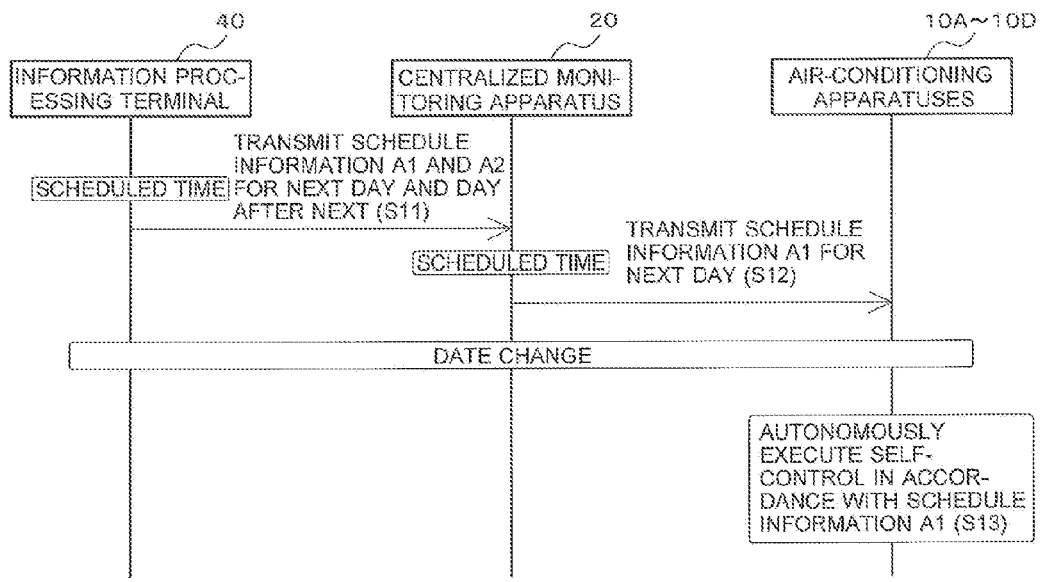
FIG. 3 is a sequence diagram illustrating a communication sequence of schedule control in a scheduled process in the air-conditioning management system according to Embodiment 1 of the present invention.

FIG. 3 is a sequence diagram illustrating a communication sequence of schedule control in a scheduled process in the air-conditioning management system according to Embodiment 1 of the present invention.

[Registration of Schedule into Information Processing Terminal 40 by User]

For each of the load-side apparatuses 12A to 12D, the user registers in the information processing terminal 40 any schedule information such as a weekly schedule for one week from Monday to Sunday and a singular day schedule applicable only to specific days. The singular day schedule is preferentially executed over the weekly schedule on days registered in the singular day schedule.

[Transmission of Schedule Information from Information Processing Terminal 40 to Centralized Monitoring Apparatus 20]

At a preset scheduled time, the schedule information transmission unit 44 of the information processing terminal 40 transmits to the centralized monitoring apparatus 20 schedule information A1 for the next day and schedule information A2 for the day after next in the schedule information registered by the user (S11).

[Transmission of Schedule Information from Centralized Monitoring Apparatus 20 to Air-Conditioning Apparatuses 10A to 10D]

The schedule information acquisition unit 21 of the centralized monitoring apparatus 20 acquires the schedule information A1 and A2 transmitted from the information processing terminal 40, and stores the schedule information A1 and A2 in the memory 24. At a preset scheduled time, the schedule control arithmetic unit 22 reads from the memory 24 the schedule information A1 for the next day for each of the air-conditioning apparatuses 10A to 10D, and transmits the schedule information A1 to each of the air-conditioning apparatuses 10A to 10D via the control command transmission unit 23 (S12). Each of the air-conditioning apparatuses 10A to 10D stores therein the received schedule information A1.

For the convenience of explanation, the same sign A1 is assigned here to the schedule information for the next day for each of the air-conditioning apparatuses 10A to 10D. However, the contents of the schedule information A1 are not necessarily the same between the air-conditioning apparatuses 10A to 10D, and may of course be different therebetween. This point similarly applies to later-described other schedule information.

[Control on Load Side]

At a date change, the air-conditioning apparatuses 10A to 10D read the schedule information A1 stored therein, and autonomously execute self-control in accordance with the schedule information A1 (S13). Thereby, the load-side apparatuses 12A to 12D execute a control of set schedule contents at a time set in the schedule information A1.

Figure 4:
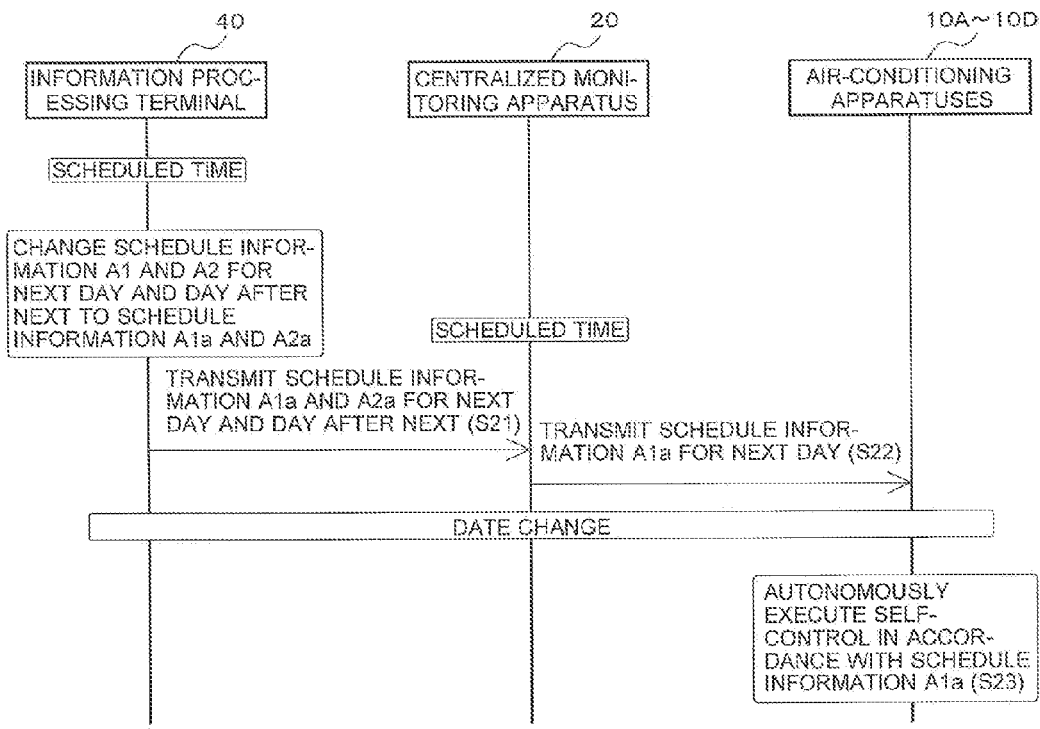
FIG. 4 is a sequence diagram illustrating a communication sequence of schedule control for a case in which schedule contents for the next day and the day after next are changed after a scheduled time in the air-conditioning management system according to Embodiment 1 of the present invention.

FIG. 4 is a sequence diagram illustrating a communication sequence in schedule control for a case in which the schedule contents for the next day and the day after next are changed after the scheduled time in the air-conditioning management system according to Embodiment 1 of the present invention.

[Change of Registration of Schedule in Information Processing Terminal 40 by User]

To make a change, such as addition or deletion of contents, in the registered schedule information, the user changes the registration of the schedule information with the information processing terminal 40. It is assumed here that the schedule information A1 and A2 for the next day is changed to schedule information A1$a$ and A2$a$ after the scheduled time, that is, after the transmission of the schedule information at the scheduled time in FIG. 3.

[Transmission of Schedule Information from Information Processing Terminal 40 to Centralized Monitoring Apparatus 20]

If the registration of the schedule information is changed by the user, the information processing terminal 40 determines whether the changed content is for the next day or the day after next, and transmits the schedule information A1$a$ and A2$a$ after the change to the centralized monitoring apparatus 20 if the changed content corresponds thereto (S21). That is, if the registration of the schedule information for the next day or the day after next is changed by the user, the information processing terminal 40 also transmits the schedule information at a time other than the scheduled time.

[Transmission of Schedule Information from Centralized Monitoring Apparatus 20 to Air-Conditioning Apparatuses 10A to 10D]

The schedule information acquisition unit 21 of the centralized monitoring apparatus 20 acquires the schedule information A1$a$ and A2$a$ transmitted from the information processing terminal 40, and stores the schedule information A1$a$ and A2$a$ in the memory 24. As described above, at the scheduled time, the schedule control arithmetic unit 22 reads from the memory 24 the schedule information A1 for the next day for each of the air-conditioning apparatuses 10A to 10D, and transmits the schedule information A1 to the air-conditioning apparatuses 10A to 10D via the control command transmission unit 23. If the schedule information for the next day is received after the scheduled time, however, the schedule control arithmetic unit 22 performs the following control separately. That is, the schedule control arithmetic unit 22 reads from the memory 24 the latest schedule information A1$a$ for the next day for each of the air-conditioning apparatuses 10A to 10D, and transmits the latest schedule information A1$a$ to each of the air-conditioning apparatuses 10A to 10D via the control command transmission unit 23 (S22). Each of the air-conditioning apparatuses 10A to 10D stores therein the received latest schedule information A1$a$.

[Control on Load Side]

At the date change, the air-conditioning apparatuses 10A to 10D read the latest schedule information A1$a$ stored therein, and autonomously execute self-control in accordance with the schedule information A1$a$ (S23). Thereby, the load-side apparatuses 12A to 12D execute a control of set schedule contents at a time set in the schedule information A1$a$.

As described above, according to Embodiment 1, the schedule information is managed by the schedule information management unit 45 of the information processing terminal 40, and the centralized monitoring apparatus 20 performs the control by transmitting the schedule information acquired from the information processing terminal 40 to the air-conditioning apparatuses 10A to 10D. The schedule information management unit 45 of the information processing terminal 40 is normally higher in the degree of selection freedom than the memory 24 used in the centralized monitoring apparatus 20 formed of an embedded device, and may be formed of a storage device with a storage capacity greater than that of the memory 24. It is therefore possible to manage a multitude of patterns of schedule information with the schedule information management unit 45 of the information processing terminal 40, allowing the user to freely create patterns of schedule in accordance with the purpose. Consequently, it is possible to obtain an air-conditioning management system capable of realizing schedule control desired by the user.

Embodiment 2

Embodiment 2 relates to protection control for a case in which the centralized monitoring apparatus 20 fails to acquire the schedule information from the information processing terminal 40.

The configuration of an air-conditioning management system in Embodiment 2 is similar to that of Embodiment 1 illustrated in FIG. 1 and FIG. 2. Further, Embodiment 2 is also similar to Embodiment 1 in the communication sequences of the schedule control in FIG. 3 and FIG. 4, and is different from Embodiment 1 in that a first protection control is further added thereto. A description will be given below mainly of differences of Embodiment 2 from Embodiment 1.

[Setting of Base Schedule Information B]

At any time, the user previously registers base schedule information B for each of the air-conditioning apparatuses 10A to 10D in the centralized monitoring apparatus 20 from the remote controller 30, the information processing terminal 40, or another device. The base schedule information B is information specifying basic schedule contents for the operation of each of the air-conditioning apparatuses 10A to 10D.

Figure 5:
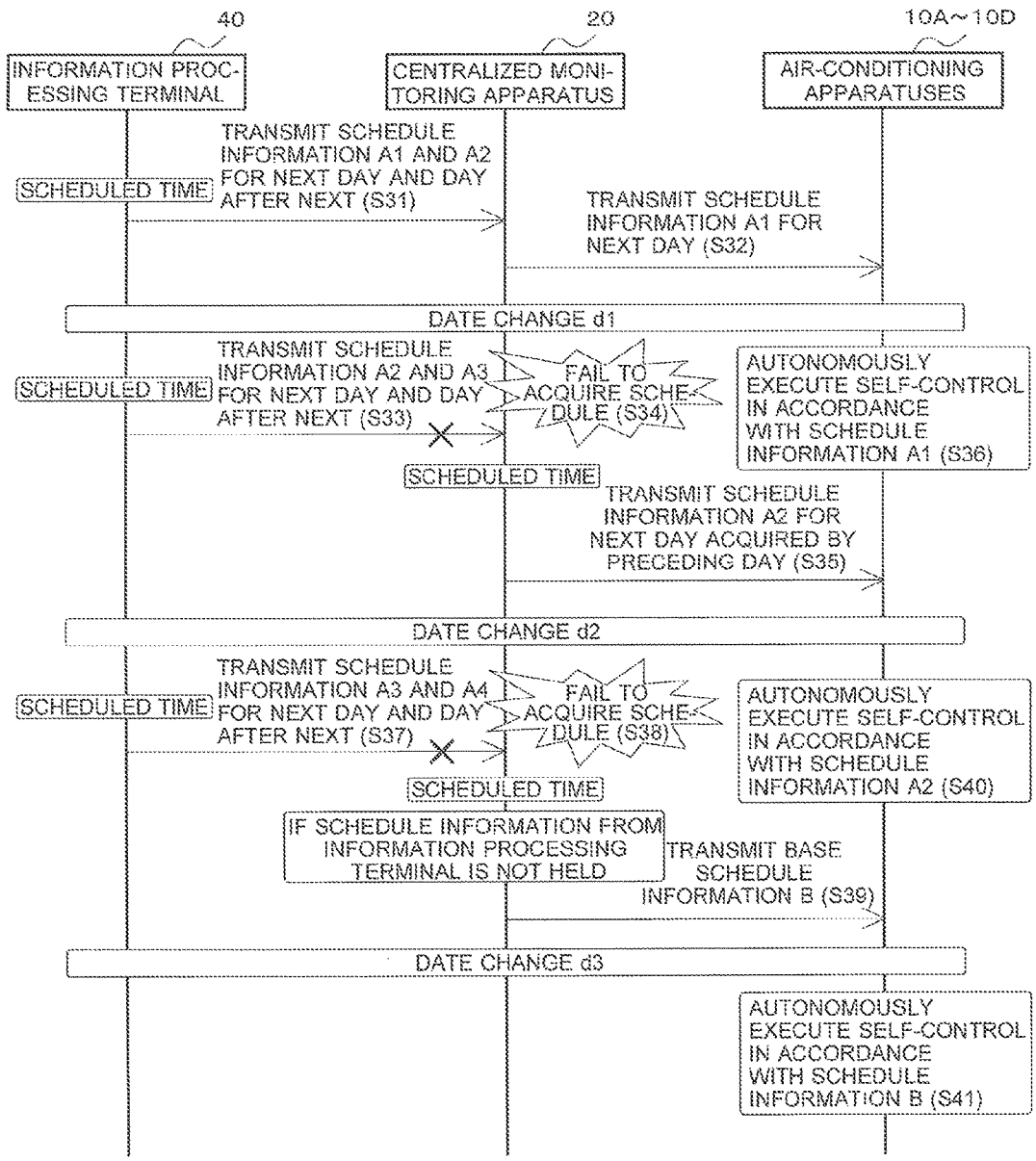
FIG. 5 is a sequence diagram illustrating a communication sequence for a case in which the centralized monitoring apparatus fails to acquire schedule information in an air-conditioning management system according to Embodiment 2 of the present invention.

FIG. 5 is a sequence diagram illustrating a communication sequence for a case in which the centralized monitoring apparatus fails to acquire the schedule information in the air-conditioning management system according to Embodiment 2 of the present invention.

[Operation in Normal State]

An operation in a normal state is similar to that in FIG. 3. The information processing terminal 40 transmits the schedule information A1 and A2 for the next day and the day after next to the centralized monitoring apparatus 20 at the scheduled time (S31), and the centralized monitoring apparatus 20 receives the schedule information A1 and A2 and transmits the schedule information A1 for the next day to the air-conditioning apparatuses 10A to 10D (S32).

[Failure to Acquire Schedule]

Then, at the scheduled time after a date change d1, the information processing terminal 40 transmits to the centralized monitoring apparatus 20 the schedule information A2 for the next day ("the schedule information A2 for the day after next" at S31 is changed to "the schedule information A2 for the next day," since it is after the date change d1) and schedule information A3 for the day after next (S33). If a power failure of the information processing terminal 40, disconnection of the communication line 53, or another failure occurs in this step, the centralized monitoring apparatus 20 is unable to acquire the schedule information A2 and A3 (S34).

[First Protection Control—1]

Even if the centralized monitoring apparatus 20 is unable to acquire the schedule information A2 and A3 from the information processing terminal 40, the schedule information A1 and A2 are stored in the memory 24 at the scheduled time on the preceding day. The centralized monitoring apparatus 20 therefore transmits to each of the air-conditioning apparatuses 10A to 10D the schedule information A2 for the next day acquired by the preceding day and stored in the memory 24 (S35).

[Control on Load Side]

Meanwhile, at the date change d1, the air-conditioning apparatuses 10A to 10D read the schedule information A1 for the day stored therein, and autonomously execute self-control in accordance with the schedule information A1 (S36). Thereby, the load-side apparatuses 12A to 12D execute the control of the set schedule contents at the time set in the schedule information A1.

[Failure to Acquire Schedule]

Then, after a further date change d2, the information processing terminal 40 transmits the schedule information A3 for the next day and schedule information A4 for the day after next to the centralized monitoring apparatus 20 (S37). It is assumed here that the acquisition of the schedule information fails again following the preceding day, with the schedule information A3 and A4 failed to be acquired (S38).

[First Protection Control—2]

The centralized monitoring apparatus 20 attempts to transmit the schedule information for the next day to the air-conditioning apparatuses 10A to 10D at the scheduled time. Due to the failure to acquire the schedule information on both the day and the preceding day, however, the centralized monitoring apparatus 20 does not hold the schedule information A3 for the next day, and thus is unable to transmit the schedule information A3. In this case, therefore, the centralized monitoring apparatus 20 transmits the previously acquired base schedule information B to each of the air-conditioning apparatuses 10A to 10D as the schedule information for the next day (S39).

[Control on Load Side]

At the date change d2, the air-conditioning apparatuses 10A to 10D read the schedule information A2 for the day stored therein, and autonomously execute self-control in accordance with the schedule information A2 (S40). Then, at a date change d3 after the receipt of the base schedule information B, the air-conditioning apparatuses 10A to 10D read the base schedule information B stored therein, and autonomously execute self-control in accordance with the base schedule information B (S41).

As described above, according to Embodiment 2, effects similar to those of Embodiment 1 are obtained, and the following effects are further obtained. That is, if the centralized monitoring apparatus 20 fails to acquire the schedule information from the information processing terminal 40, the centralized monitoring apparatus 20 controls the air-conditioning apparatuses 10A to 10D in accordance with the preset base schedule information B. It is thereby possible to prevent the air-conditioning apparatuses 10A to 10D from being kept in an unintended operation, halt, or another state over an extended period of time not intended by the user. It is thus possible to maintain the indoor air-conditioning quality with the protection control of the centralized monitoring apparatus 20, even if the centralized monitoring apparatus 20 is unable to acquire the schedule information from the information processing terminal 40.

Embodiment 3

Embodiment 3 relates to protection control for a case in which the air-conditioning apparatuses 10A to 10D fail to acquire the schedule information from the centralized monitoring apparatus 20.

The configuration of an air-conditioning management system according to Embodiment 3 is similar to that of Embodiment 1 illustrated in FIG. 1 and FIG. 2. Further, Embodiment 3 is also similar to Embodiments 1 and 2 in the communication sequences of the schedule control in FIG. 3 to FIG. 5, and is different from Embodiments 1 and 2 in that a second protection control is further added thereto. A description will be given below mainly of differences of Embodiment 3 from Embodiment 1.

[Setting of Base Schedule Information B]

At any time, the user previously registers the base schedule information B for each of the air-conditioning apparatuses 10A to 10D in each of the air-conditioning apparatuses 10A to 10D from the remote controller 30, the information processing terminal 40, or another device. The base schedule information B is information specifying basic schedule contents for the operation of each of the air-conditioning apparatuses 10A to 10D.

Figure 6:
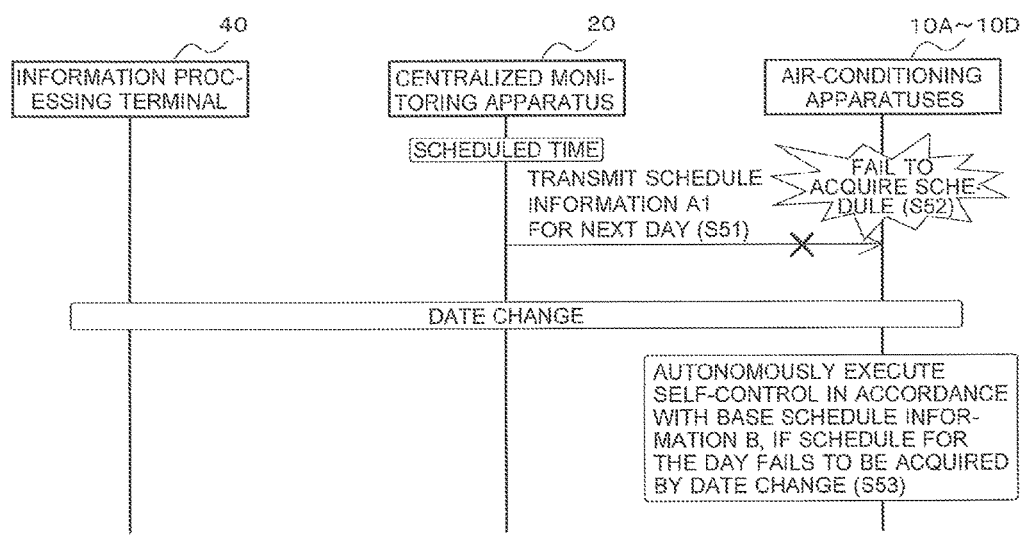
FIG. 6 is a sequence diagram illustrating a communication sequence for a case in which air-conditioning apparatuses fail to acquire the schedule information in an air-conditioning management system according to Embodiment 3 of the present invention.

FIG. 6 is a sequence diagram illustrating a communication sequence for a case in which the load-side apparatuses fail to acquire the schedule information in the air-conditioning management system according to Embodiment 3 of the present invention.

[Failure to Acquire Schedule]

At the scheduled time, the centralized monitoring apparatus 20 transmits the schedule information A1 for the next day to the air-conditioning apparatuses 10A to 10D (S51). If a power failure of the centralized monitoring apparatus 20, disconnection of the communication lines 50A to 50D and 52, or another failure occurs in this step, the air-conditioning apparatuses 10A to 10D are unable to acquire the schedule information A1 (S52).

[Second Protection Control]

At a date change, the air-conditioning apparatuses 10A to 10D attempt to read the schedule information for the day stored therein. Due to the failure to acquire the schedule information for the day on the preceding day, however, the schedule information A1 for the day is absent. In this case, the air-conditioning apparatuses 10A to 10D autonomously execute self-control in accordance with the previously acquired base schedule information B (S53).

As described above, according to Embodiment 3, effects similar to those of Embodiment 1 and Embodiment 2 are obtained, and the following effects are further obtained. That is, if the air-conditioning apparatuses 10A to 10D are unable to acquire the schedule information for the next day from the centralized monitoring apparatus 20 by the date change, the air-conditioning apparatuses 10A to 10D execute an autonomous operation in accordance with the preset base schedule information B. It is thereby possible to prevent the air-conditioning apparatuses 10A to 10D from being kept in an unintended operation, halt, or another state over an extended period of time not intended by the user. It is thus possible to maintain the indoor air-conditioning quality with the protection control of the air-conditioning apparatuses 10A to 10D, even if the air-conditioning apparatuses 10A to 10D are unable to acquire the schedule information.

In the description given above, the schedule information transmitted from the information processing terminal 40 to the centralized monitoring apparatus 20 is for the next day and the day after next, and the schedule information transmitted from the centralized monitoring apparatus 20 to the air-conditioning apparatuses 10A to 10D is for the next day. However, schedule information for a day(s) subsequent thereto may also be transmitted. Needless to say, the schedulable period is extended in this case.

The invention claimed is:

1. An air-conditioning management system comprising:
   at least one air-conditioning apparatus;
   a centralized monitoring apparatus comprising a first processor and a memory, the first processor is configured to perform centralized management of the at least one air-conditioning apparatus; and
   an information processing terminal connectable to the centralized monitoring apparatus via a communication line,
   the information processing terminal comprising a second processor and a schedule information management unit, the second processor is configured to
   store, in a schedule information management unit, a plurality of items of the schedule information of the at least one air-conditioning apparatus input by a user, wherein the schedule information in the schedule information management unit covers a plurality of time periods,
   select, from the plurality of items of the schedule information stored in the schedule information management unit, schedule information to be transmitted to the at least one air-conditioning apparatus, wherein the selected schedule information is selected to cover less than all of the plurality of time periods, and
   transmit the selected schedule information, as a periodic scheduled process, to the centralized monitoring apparatus,
   the first processor of the centralized monitoring apparatus is further configured to
   acquire the selected schedule information transmitted from the information processing terminal via the communication line, wherein the centralized monitoring apparatus receives and stores only a subset of the schedule information stored in the information processing terminal,
   transmit the acquired selected schedule information to the at least one air-conditioning apparatus and
   cause the air-conditioning apparatus to self-operate according to the selected schedule information.

2. The air-conditioning management system of claim 1, wherein the information processing terminal selects, from the plurality of items of the schedule information stored in the schedule information management unit, at least schedule information for a next day, and transmits the selected schedule information to the centralized monitoring apparatus,
   wherein the first processor of centralized monitoring apparatus is further configured to
   store, in the memory, the schedule information for the next day transmitted from the information processing terminal via the communication line,
   read the schedule information for the next day from the memory, and
   transmit to the at least one air-conditioning apparatus the schedule information for the next day, and
   wherein the at least one air-conditioning apparatus receives the schedule information for the next day transmitted from the centralized monitoring apparatus, and performs self operation control on a day following a day of the reception in accordance with the received schedule information.

3. The air-conditioning management system of claim 2, wherein the second processor of the information processing terminal is further configured to transmit every day the schedule information for the next day and a day after next to the centralized monitoring apparatus, and the first processor of the centralized monitoring apparatus is further configured to perform every day a process of storing in the memory the schedule information for the next day and the day after next transmitted from the information processing terminal, and
   wherein the first processor of the centralized monitoring apparatus is further configured to:
   when the first processor fails to acquire the schedule information for the next day and the day after next from the information processing terminal, read the schedule information corresponding to the schedule information for the next day from the schedule information acquired by a preceding day and stored in the memory, and
   transmit the read schedule information to the at least one air-conditioning apparatus.

4. The air-conditioning management system of claim 2, wherein the first processor of the centralized monitoring apparatus is further configured to:
   when the first processor fails to acquire the schedule information transmitted from the information processing terminal and does not have the schedule information for the next day in the memory, transmit previously held base schedule information specifying basic schedule contents to the at least one air-conditioning apparatus as the schedule information for the next day.

5. The air-conditioning management system of claim 1, wherein when the at least one air-conditioning apparatus fails to acquire the schedule information for the next day transmitted from the centralized monitoring apparatus, the at least one air-conditioning apparatus performs the self operation control on a day following a day of the failure in accordance with previously held base schedule information specifying basic schedule contents.

6. The air-conditioning management system of claim 1, wherein the schedule information includes information that relates to a schedule for the at least one air-conditioning apparatus, the information that relates to a schedule for the at least one air-conditioning apparatus including at least one item of information on
   a start time of one of a heating operation and a cooling operation,
   a stop time of one of a heating operation and a cooling operation, and
   an execution timing of a defrosting operation.

7. The air-conditioning management system of claim 1, wherein the second processor of the information processing terminal is further configured select the schedule information to cover a predetermined period of time, at a first preset scheduled time transmit the selected schedule information to the centralized monitoring apparatus.

8. The air-conditioning management system of claim 7, wherein the first processor of the centralized monitoring apparatus is further configured to
at a second preset scheduled time which is after the first preset scheduled time, transmit the acquired selected schedule information to the at least one air-conditioning apparatus.

* * * * *